United States Patent Office 3,376,705
Patented Apr. 9, 1968

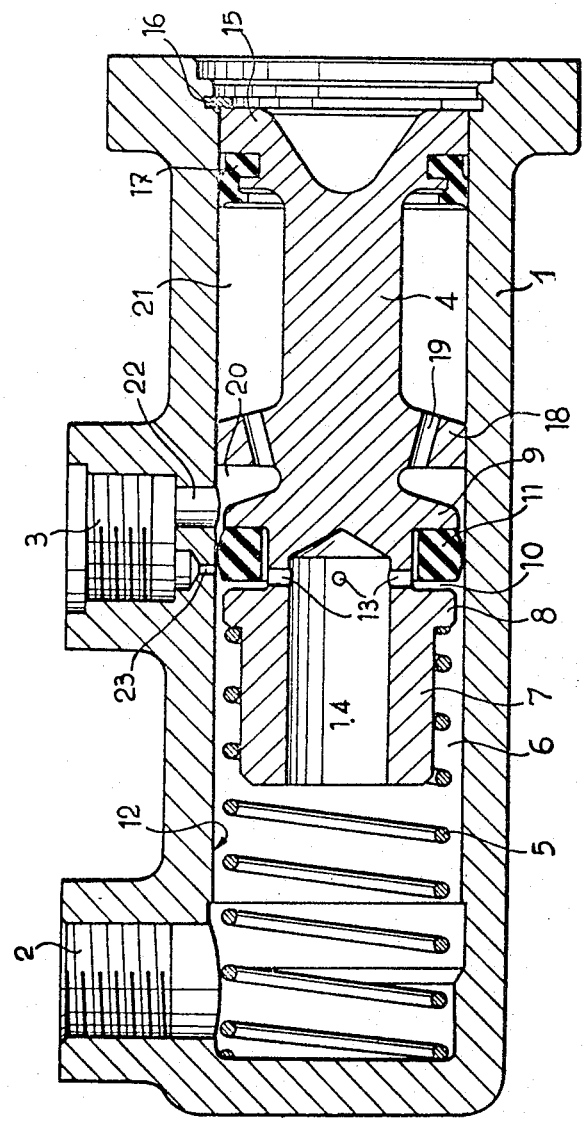

3,376,705
HYDRAULIC PRESSURE GENERATING
CYLINDER
Luigi Valpreda, 200 Corso Giovanni Agnelli, Turin, Italy,
assignor to Fiat Società per Azioni, Turin, Italy
Filed Aug. 3, 1966, Ser. No. 569,890
Claims priority, application Italy, Aug. 6, 1965,
18,093/65
2 Claims. (Cl. 60—54.6)

This invention relates to hydraulic pressure generating arrangements of the piston and cylinder type and more particularly to clutch control arrangements or arrangements for actuating hydraulic brakes on motor vehicles.

Arrangements of this type are known in which communication between the reservoir and the compression chamber is controlled by a valve and such a valve generally comprises a sealing ring which seals the space between the cylinder and the piston during the compression stroke of the latter. The ring is usually floatingly mounted in an annular groove formed in the periphery of the piston head at the end thereof directed towards the cylinder compression chamber.

In such arrangements the piston diameter is substantially smaller than the cylinder bore, the piston being centered in the axial bore of the cylinder by means of two annular projections on the piston. These comprise a projection on the piston head, situated in front of the floating ring valve, and a rear projection at the piston end remote from the compression chamber.

If this arrangement is to operate satisfactorily a fluid passage must be provided in the front projection. This passage is generally formed by milling one or a plurality of small channels in the periphery of the front projection but such milling results in the formation of sharp edges which must be carefully deburred to prevent scoring of the inner cylinder wall and consequent fluid leakage.

An object of the invention is to provide a pressure generating piston and cylinder arrangement which obviates the above-mentioned drawbacks and is at the same time simple and inexpensive in construction, and reliable in operation.

A further object is to provide an hydraulic pressure generating arrangement of the piston and cylinder type herein referred to, the piston head thereof being formed with a diameter substantially smaller than the cylinder bore and including a ring seal or the like, an intermediate annular centering projection being provided on the piston between the head thereof and a rear annular projection at the piston end remote from the said head and a compression chamber closed thereby, the said intermediate projection substantially equalling in diameter the cylinder bore and being formed with generally axial through channels arranged to interconnect the two chambers into which it divides the annular space existing between the piston and the cylinder inner wall.

This and other objects and advantages of the invention will be clear from the following description, given with reference to the accompanying drawing which is by way of example and which shows a longitudinal sectional view of a pressure generating arrangement according to the invention.

The arrangement shown comprises a cylinder 1 open at one end, the inside of the said cylinder connecting with bosses 2, 3 formed with tapped holes for the attachment of pipe connectors (not shown) adapted to connect the cylinder with a hydraulic circuit and a reservoir, respectively (also not shown).

A piston 4 is a slidingly mounted within the cylinder and is constantly urged in the direction of the open end thereof by a reaction spring 5 arranged in the compression chamber 6 of the cylinder, which chamber connects with the boss.

One end of the spring is fitted over a tubular forward extension 7 of the piston and bears against a front annular projection 8 which forms, together with a further front annular projection 9 spaced therefrom towards the piston end remote from the extension 7, the so-called piston head.

The opposing walls of the annular projections 8 and 9, the diameter of each of which projections is smaller than the bore of the cylinder 1, define in the piston head an annular groove 10. The latter accommodates a sealing ring 11 of resilient material, the outer circumference of which ring is constantly in contact with the cylinder inner wall and is of a slightly arcuate profile in cross section. The projections and ring are so proportioned that the thickness of the ring as measured in the axial direction thereof, is less than the spacing of the opposing walls of the projections 8, 9, the bore through the ceiling ring being greater than the diameter of the bottom of the groove 10. As a result of this dimensioning the sealing ring is floatingly mounted within the groove 10.

The groove 10 connects, through radial holes 13, with an axial central channel 14 in the extension 7, which channel extends in part through the piston body at the head of the latter.

The piston rear end, that is to say the end thereof remote from its head, is formed with an annular projection 15. When the arrangement is inoperative, as is the state shown in the drawing, the projection 15 bears against an expansible stop ring 16 received by an annular recess in the cylinder inner wall near the open end of the latter. The projection 15 is itself provided with an annular recess accommodating a rear sealing ring 17.

The portion of the piston 4 between the rear annular projection 15 and the projections 8, 9 is centered by means of an intermediate annular projection 18 and the outer diameters of the projections 15 and 18 each substantially equal the nominal diameter of the inner wall 12 of the cylinder to give a tight sliding fit therebetween. The projection 18 is formed with generally axial through holes 19 interconnecting annular spaces 20, 21 in the cylinder separated by the said projection. When the cylinder is in its inoperative condition, as shown, the holes further connect the said spaces with the hydraulic fluid reservoir through a channel 22 leading to boss 3 and a connector (not shown) screwed into the said boss.

In use the cylinder operates as follows:

In order to raise the pressure in the compression chamber 6, the piston 4 is urged by known means (not shown) in the direction of the closed end of the cylinder. The resultant and inevitable movement of the seal ring 11 within the groove 10 towards the facing wall of the annular projection 9 causes interception of a compensating orifice 23 by the ring periphery and a consequent disconnection of the compression chamber 6 and the circuits associated therewith, from the circuits to the hydraulic fluid reservoir.

During this stage of operation the ring 11 undergoes axial compression against the projection 9 and there results a radial expansion of the ring which of course increases its sealing action.

On release of the pressure upon the piston the reaction spring 5 tends to restore it sharply to its original position, in which the rear annular projection 15 rests on the stop ring 16. This results in a relative displacement of the seal 11 with respect to the piston and movement of the said seal into contact with the facing wall of the annular projection 8. Interconnection of the reservoir and compression chamber is thereby reestablished through the path 14, 13, 10 (now between 9 and 11) and the annular clearance permanently existing between the annular projection 9 and the inner wall 12 of the cylinder.

Various modifications of the invention are of course possible within the scope of the appended claims.

What I claim is:

1. An hydraulic pressure generating arrangement of the piston and cylinder type herein referred to, the arrangement comprising:
   A. a piston,
   B. a cylinder therefor, and
   C. valve sealing means such as a ring seal, said piston having a head portion formed with a diameter substantially smaller than the said cylinder bore and carrying the said sealing means to delimit a compression chamber in the cylinder, the said piston carrying a rear annular projection at its end remote from the said piston head portion and an intermediate annular projection located between the said piston head portion and the said rear annular projection, the said intermediate projection substantially equalling in diameter the bore of the said cylinder and being formed with generally axial through channels arranged to interconnect two chambers into which the said intermediate projection divides the annular space existing between the said piston and the inner wall of the said cylinder.

2. An arrangement according to claim 1 wherein the said intermediate projection is located nearer to the said piston head than to the said rear projection.

No references cited.

MARTIN P. SCHWADRON, *Primary Examiner.*

ROBERT R. BUNEVICH, *Examiner.*